(12) United States Patent
Maruyama

(10) Patent No.: US 6,469,865 B1
(45) Date of Patent: Oct. 22, 2002

(54) DISK APPARATUS

(75) Inventor: Masuo Maruyama, Moriguchi (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 14 days.

(21) Appl. No.: 09/711,856

(22) Filed: Nov. 13, 2000

(30) Foreign Application Priority Data

Nov. 16, 1999 (JP) .......................................... 11-325090

(51) Int. Cl.$^7$ ............................................... G11B 17/04

(52) U.S. Cl. ................................................... 360/99.06

(58) Field of Search ........................... 360/99.06, 99.12; 369/77.1–77.2, 75.1–75.2

(56) References Cited

U.S. PATENT DOCUMENTS 5,930,074 A * 7/1999 Nicklos ................... 360/99.06
6,285,643 B1 * 9/2001 Arai .......................... 369/77.2

FOREIGN PATENT DOCUMENTS

JP 09-091821 4/1997

* cited by examiner

Primary Examiner—Allen Cao
(74) Attorney, Agent, or Firm—Kenner, Otto, Boisselle & Sklar

(57) ABSTRACT

A disk apparatus to which a cartridge accommodating a disk for recording or reproducing information thereon is loaded, the cartridge having a shutter capable of opening so as to expose the disk is provided. The disk apparatus includes: a disk transporting section for transporting the cartridge from an unloaded position to a loaded position; and an opener for opening the shutter in a slide direction which is perpendicular to a transportation direction of the cartridge. A leading end face of the cartridge in the transportation direction of the cartridge has a first end face and a second end face, the first end face extending in the transportation direction and the second end face extending in the slide direction. The shutter is opened responsive to a pressurizing force applied in the slide direction to the first end face from the opener. The opener applies a pressure to the first end face, but does not substantially apply a pressure to the second end face, during substantially a first half of an opening operation of the shutter.

5 Claims, 9 Drawing Sheets

DISK APPARATUS

BACKGROUND OF THE INVENTION

1. Field of the Invention

The present invention relates to a disk apparatus, and in particular to a disk apparatus which transports a disk for recording or reproducing information thereon into a main body of the disk apparatus during a transition from an unloaded state to a loaded state, the disk being accommodated in a cartridge.

2. Description of the Related Art

A conventional disk apparatus is known from Japanese Laid-Open Publication No. 9-91821, for example. Hereinafter, this conventional disk apparatus will be described with reference to the accompanying figures.

FIG. 8 is an upper plan view illustrating a portion of the conventional disk apparatus 800. The disk apparatus 800 generally includes a main body 51 and a tray 52. The tray 52 transports a cartridge 54, in which a disk 53 is accommodated, in a direction T (hereinafter referred to as the "transportation direction" or "insertion direction") with respect to the disk apparatus main body 51, causing the cartridge 54 to shift from an unloaded state to a loaded state. The tray 52 can also transport the cartridge 54 in a direction T' opposite to the transportation or insertion direction T causing the cartridge 54 to shift from a loaded state to an unloaded state. The cartridge 54 has a shutter 55 which can be opened so as to expose the disk 53. FIG. 8 illustrates an unloaded state of the cartridge 54, i.e., the tray 52 being outside the disk apparatus main body 51.

Hereinafter, the structure of the disk apparatus 800 will be described in more detail, with reference to FIGS. 8 and 9. FIG. 9 is a side view of a portion of the disk apparatus 800, showing a cross section of the tray 52 along line IX—IX in FIG. 8 and a perspective view of the main body 51 as observed from direction D in FIG. 8.

The main body 51 includes a roof 57. The roof 57 supports a clamp arm 58 and an opener 61. The clamp arm 58 supports a clamper 60 in a pivotable manner. The clamper 60 is driven by the clamp arm 58 so as to pressurize the disk 53 against a disk motor 67 of the disk apparatus main body 51. The clamp arm 58 further includes a clamp arm spring 59, which biases the clamp arm 58 so as to restore its original position.

The opener 61, which is a means for opening and assisting the closing of the shutter 55 of the cartridge 54, is pivotably supported around a mounting/pivoting axis 63 for the opener 61. The opener 61 includes an opener spring 62, which is supported between a spring hooking member 64 projecting from a spring hooking aperture 65 and a spring hook 66 mounted on the roof 57. The opener spring 62 provides a force which brings back the opener 61 to a predetermined position. At some point during the transportation of the cartridge 54 into the disk apparatus main body 51, the shutter 55 abuts against a leading edge of the opener 61, so that a pressurizing force from the opener 61 causes the shutter 55 to slide in a slide direction S. As a result of this slide operation, the shutter 55 opens so as to expose the disk 53 which is accommodated within the cartridge 54.

The disk apparatus main body 51 further includes a motor support base 68. The motor support base 68 supports the disk motor 67, a positioning pin 69, a cartridge support pin 70, and the like. As shown in FIG. 9, the motor support base 68 is tilted (i.e., not in the direction T) in an unloaded state of the cartridge 54, thereby clearing the way for the cartridge 54 to be inserted. Once the cartridge 54 is loaded, the motor support base 68 approaches the cartridge 54 so as to be no longer tilted but instead be in plane with the direction T, preferably horizontal. The positioning pin 69 engages with a positioning hole 56 in the cartridge 54 which has been transported into the disk apparatus main body 51, thereby restricting the positioning of the cartridge 54 along the horizontal and height directions. The cartridge support pin 70 also serves to position the cartridge 54 along the height direction.

FIG. 10A is an upper plan view similar to FIG. 8, illustrating an intermediate state between the unloaded state shown in FIG. 8 and a loaded state of the cartridge 54. FIG. 10B is an enlarged view of a portion of FIG. 10A, showing how the shutter 55 and the opener 61 contact each other. As illustrated in FIG. 10B, a pressurizing force which is received by the shutter 55 from the opener 61 as the shutter 55 begins to open is resolved into two component forces: an opening force d which acts to open the shutter 55 and a component force e which acts in such a direction as to dispel the cartridge 54 out of the disk apparatus main body 51. Since the component force e is greater than the opening force d, the shutter 55 will be strongly pressurized against the body of the cartridge 54. As a result, the opening operation of the shutter 55 entails a large loading force, creating a large burden on the cartridge transportation. For similar reasons, the shutter 55 and the body of the cartridge 54 may act to abrade each other, ultimately making it difficult to open or close the shutter 55.

SUMMARY OF THE INVENTION

According to the present invention, there is provided a disk apparatus to which a cartridge accommodating a disk for recording or reproducing information thereon is loaded, the cartridge having a shutter capable of opening so as to expose the disk, the disk apparatus including: a disk transporting section for transporting the cartridge from an unloaded position to a loaded position; and an opener for opening the shutter in a slide direction which is perpendicular to a transportation direction of the cartridge, wherein a leading end face of the cartridge in the transportation direction of the cartridge has a first end face and a second end face, the first end face extending in the transportation direction and the second end face extending in the slide direction, wherein the shutter is opened responsive to a pressurizing force applied in the slide direction to the first end face from the opener, and wherein the opener applies a pressure to the first end face, but does not substantially apply a pressure to the second end face, during substantially a first half of an opening operation of the shutter.

In one embodiment of the invention, the opener is in contact with the first end face but is not in contact with the second end face during substantially the first half of the opening operation of the shutter.

In another embodiment of the invention, the disk transportation section includes a pressurization member provided in a position located ahead of the cartridge along the transportation direction, the pressurization member being arranged so as to engage with the opener during substantially the first half of the opening operation of the shutter.

In still another embodiment of the invention, a distance between the second end face and a point of contact between the pressurization member and the opener is greater than a distance between the point of contact and a point on an edge of the opener that comes closest to the cartridge.

In still another embodiment of the invention, the opener and the pressurization member are arranged so as to be in contact with each other during substantially the first half of the opening operation of the shutter and not during substantially a latter half of the opening operation of the shutter.

Thus, the invention described herein makes possible the advantage of providing a disk apparatus which can reduce the loading force during an opening operation of a shutter of a cartridge.

This and other advantages of the present invention will become apparent to those skilled in the art upon reading and understanding the following detailed description with reference to the accompanying figures.

DESCRIPTION OF THE PREFERRED EMBODIMENTS

Figure 1:
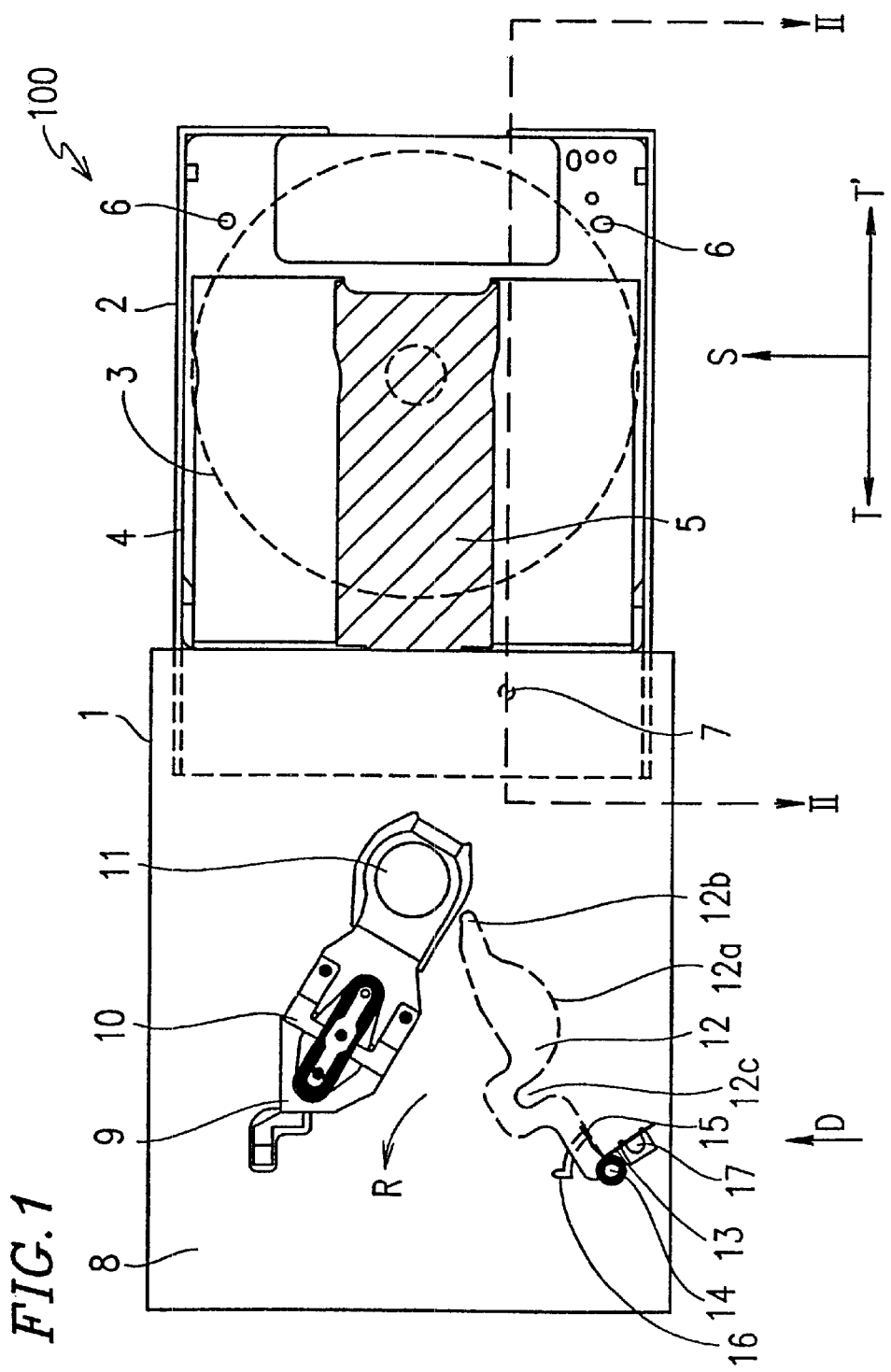
FIG. 1 is an upper plan view illustrating a portion of a disk apparatus according to one embodiment of the present invention.

FIG. 1 is an upper plan view illustrating a portion of a disk apparatus 100 according to one embodiment of the present invention. The disk apparatus 100 generally includes a main body 1 and a tray (or "disk transporting section") 2. The tray 2 transports a cartridge 4, in which a disk 3 is accommodated, in a direction T (hereinafter referred to as the "transportation direction" or "insertion direction") with respect to the disk apparatus main body 1, causing the cartridge 4 to shift from an unloaded position to a loaded position. The tray 2 can also transport the cartridge 4 in a direction T' opposite to the transportation or insertion direction T causing the cartridge 4 to shift from a loaded position to an unloaded position. The cartridge 4 has a shutter 5 which can be opened so as to expose the disk 3. FIG. 1 illustrates an unloaded state of the cartridge 4, i.e., the tray 2 being outside the disk apparatus main body 1.

Figure 2:
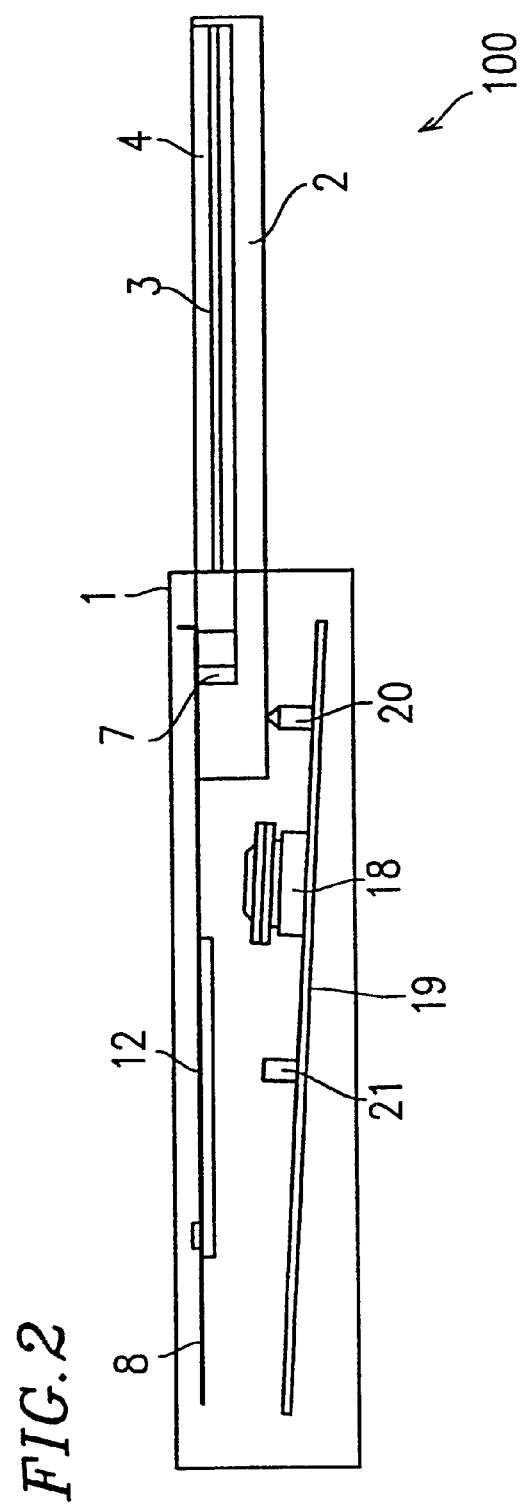
FIG. 2 is a side view of a portion of the disk apparatus shown in FIG. 1, including a partial cross section view thereof.

Hereinafter, the structure of the disk apparatus 100 will be described in more detail, with reference to FIGS. 1 and 2. FIG. 2 is a side view of a portion of the disk apparatus 100, showing a cross section of the tray 2 along line II—II in FIG. 1 and a perspective view of the main body 1 as observed from direction D in FIG. 1.

The main body 1 includes a roof 8. The roof 8 supports a clamp arm 9 and an opener (or "shutter opening/closing section") 12. The clamp arm 9 supports a clamper 11 in a pivotable manner. The clamper 11 is driven by the clamp arm 9 so as to pressurize the disk 3 against a disk motor 18 of the disk apparatus main body 1. The clamp arm 9 further includes a clamp arm spring 10, which biases the clamp arm 9 so as to restore its original position.

The opener 12, which is a means for opening and assisting the closing of the shutter 5 of the cartridge 4, is pivotably supported around a mounting/pivoting axis 14 for the opener 12. The opener 12 includes an opener spring 13, which is supported between a spring hooking member 15 projecting from a spring hooking aperture 16 and a spring hook 17 mounted on the roof 8. The opener spring 13 provides a force which brings back the opener 12 to a predetermined position.

At some point during the transportation of the cartridge 4 into the disk apparatus main body 1, the shutter 5 abuts against a leading edge 12b of the opener 12, so that a pressurizing force from the opener 12 causes the shutter 5 to slide in a slide direction S. As a result of this slide operation, the shutter 5 opens so as to expose the disk 3 which is accommodated within the cartridge 4. This opening operation will be described later in more detail.

The disk apparatus main body 1 further includes a motor support base 19. The motor support base 19 supports the disk motor 18, a positioning pin 20, a cartridge support pin 21, and the like. As shown in FIG. 2, the motor support base 19 is tilted (i.e., not in the direction T) in an unloaded state of the cartridge 4, thereby clearing the way for the cartridge 4 to be inserted. Once the cartridge 4 is loaded, the motor support base 19 approaches the cartridge 4 so as to be no longer tilted but instead be in plane with the direction T, preferably horizontal. The positioning pin 20 engages with a positioning hole 6 in the cartridge 4 which has been transported into the disk apparatus main body 1, thereby restricting the positioning of the cartridge 4 along the horizontal and height directions. The cartridge support pin 21 also serves to position the cartridge 4 along the height direction.

In accordance with the disk apparatus 100 according to the present invention, the tray (or "disk transporting section") 2 includes a pressurization member 7 which is provided in a position located ahead of the cartridge 4 along the insertion direction T. The pressurization member 7 cooperates with the opener 12 so that when the cartridge 4 is transported into the disk apparatus main body 1, the opener 12 rotates in the slide direction S immediately before the leading edge 12b comes in contact with an end face ("F1" in FIGS. 4A and 4B; described later) of the shutter 5 which defines an area extending in the slide direction S and is preferably parallel thereto. In accordance with this construction, the opener 12 is prevented from generating any component force that acts in such a direction as to dispel the cartridge 4 out of the disk apparatus main body 1 during an opening operation of the shutter 5.

In order to attain the aforementioned effects, the opener (or "shutter opening/closing section") 12 according to the present invention is designed so as to have an arc portion ("cam portion") 12a on a portion of its edge or perimeter facing away from the direction R of the rotation of the opener 12 during an opening operation of the shutter 5 as, for example, shown in FIG. 1. Furthermore, the opener 12 also has on the said portion of the edge a recess 12c intruding in the rotation direction R, which recess 12c is located between the cam portion 12a and the mounting/pivoting axis 14.

Hereinafter, a loading operation of the cartridge 4 by the disk apparatus 100 having the aforementioned pressurization member 7 and the opener 12 will be described.

In the cartridge unloaded state as shown in FIGS. 1 and 2, the tray 2 and the cartridge 4 lie outside the disk apparatus main body 1, and the motor support base 19 is tilted, thereby clearing the way for the tray 2 and the cartridge 4 to be inserted. In a transition from this state to a cartridge loaded state, the tray 2 and the cartridge 4 begin to slide into the disk apparatus main body 1 along a horizontal direction (i.e., in general the insertion direction T).

Figure 3:
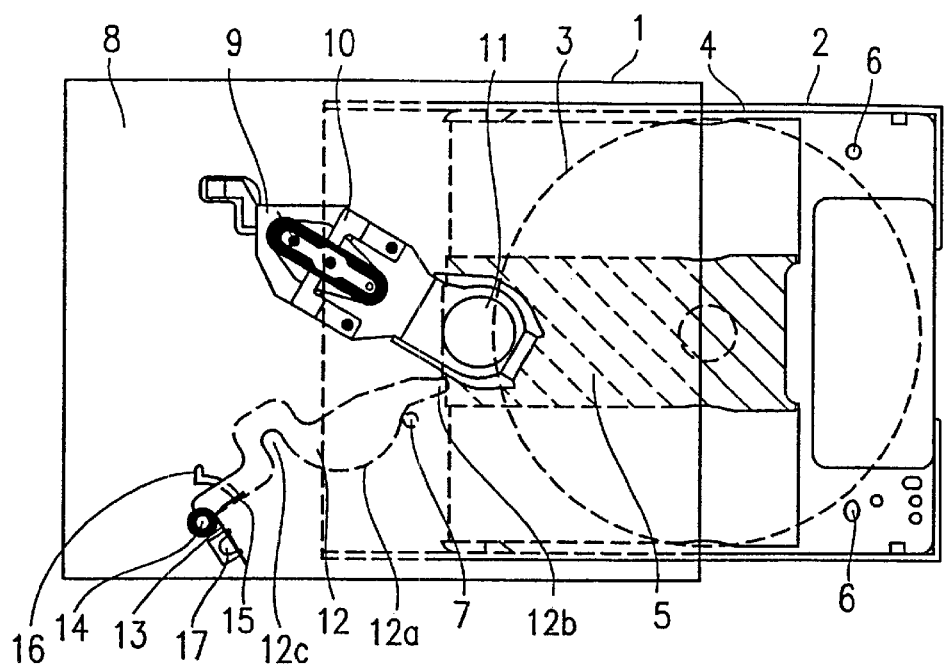
FIG. 3 is an upper plan view of a portion of a disk apparatus according to one embodiment of the present invention, illustrating an intermediate state between a cartridge unloaded state shown in FIG. 1 and a cartridge loaded state.
Figure 4A:
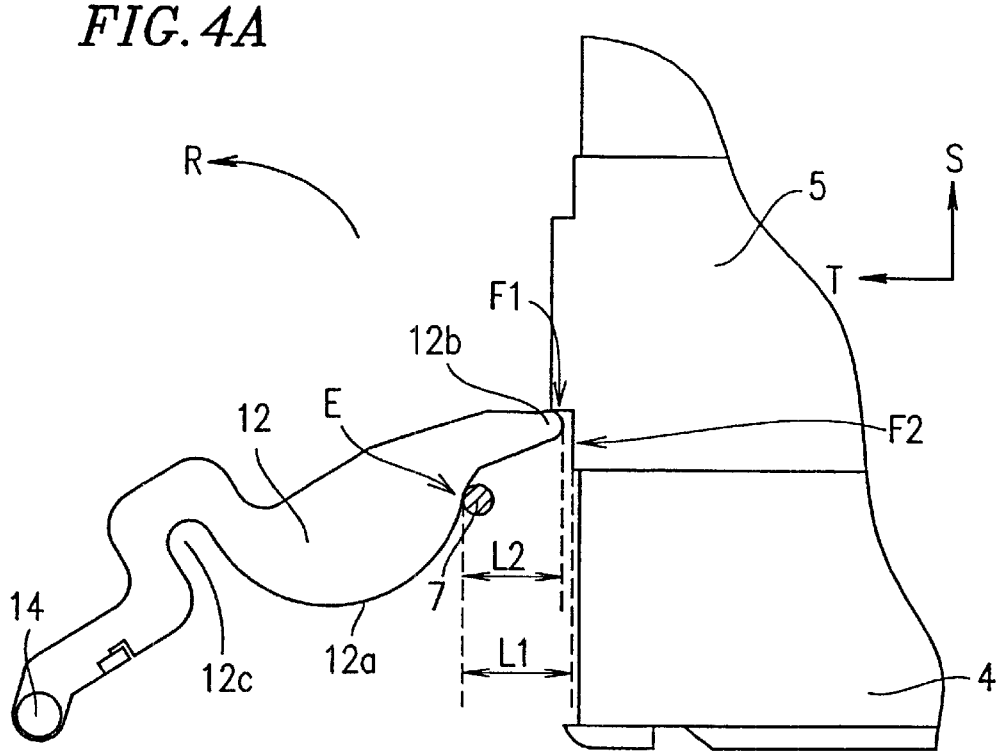
FIG. 4A is an enlarged view of a portion of the disk apparatus shown in FIG. 3.

FIG. 3 is an upper plan view similar to FIG. 1, illustrating an intermediate state between the unloaded state shown in FIG. 1 and a loaded state of the cartridge 4. The leading edge 12b of the opener 12 first engages with the shutter 5 of the cartridge 4 in such an intermediate state. FIG. 4A is an enlarged view of a portion of FIG. 3, showing how the shutter 5 and the opener 12 contact each other.

In the intermediate state illustrated in FIGS. 3 and 4A', the pressurization member 7 contacts the cam portion 12a immediately before the leading edge 12b of the opener 12 would otherwise come in contact with the end face F2 ("second end face") of the shutter 5. The second end face F2 of the shutter 5 defines an area extending substantially perpendicular to the insertion direction T of the shutter 5, or in parallel to the slide direction S. As a result, the leading edge 12b of the opener 12 only contacts an end face F1 ("first end face") of the shutter 5 which defines an area extending in the insertion direction T and preferably in parallel thereto, while being prevented from contacting the second end face F2 of the shutter 5, thereby only pressurizing the shutter 5 in the slide direction S to effect the opening operation of the shutter 5. During the opening operation, the pressurization member 7 slides on and along the cam portion 12a, thereby moving toward the mounting/pivoting axis 14. This sliding operation of the pressurization member 7 generates a force which rotates the opener 12 around the mounting/pivoting axis 14 in the rotation direction R.

In order to ensure that the opener 12 contacts the first end face F1 without contacting the second end face F2 during the opening operation, according to the present invention, a distance L1 between the second end face F2 and a point of contact E between the pressurization member 7 and the cam portion 12a is maintained greater than a distance L2 between the point of contact E and a point on the edge of the opener 12 that comes closest to the cartridge 4, as shown in FIG. 4A. As a result, the shutter 5 gradually opens due to a pressurizing force which occurs only in the slide direction S.

In accordance with the aforementioned structure, the shutter 5 can undergo an opening operation without being pressurized in the opposite direction T' from the insertion direction T of the cartridge 4. As a result, the loading force required at the time of opening of the shutter 5 is reduced, thereby preventing abrasion between the shutter 5 and the main body of the cartridge 4.

The present invention contemplates embodiments in which the cam portion 12a and the pressurization member 7 always contact each other throughout the entire opening operation of the shutter 5. However, according to the presently illustrated embodiment, the length of the period of contact is limited so as to span only part of the opening operation of the shutter 5. Specifically, the contact between the cam portion 12a and the pressurization member 7 is maintained during the first half of the opening operation of the shutter 5, i.e., until the distance ("slide distance") traveled by the shutter 5 in the slide direction S equals approximately a half of the slide distance that would be required for the shutter 5 to be fully open. On the other hand, during the latter half of the opening operation of the shutter 5 (i.e., the remainder of the opening operation after the lapse of the first half), the contact between the cam portion 12a and the pressurization member 7 is no longer maintained. Herein, it should be appreciated that the "first half" and the "latter half" are not meant to be the exact halves of the entire opening operation of the shutter 5.

The rational behind such a construction according to the present embodiment is as follows: In the latter half of the opening operation of the shutter 5, the component force from the opener 12 which acts to pressurize the shutter 5 in the opposite direction from the insertion direction T of the cartridge 4 becomes sufficiently small, so that the opener 12 can stably support the shutter 5 even if there is no contact between the cam portion 12a and the pressurization member 7. Taking advantage of this fact, according to the present embodiment of the invention, the opener 12 is configured so that there is no contact between the cam portion 12a and the pressurization member 7 during the latter half of the opening operation of the shutter 5, in order to prevent the opener 12 from being disengaged from the shutter 5 and ensure a stable open position of the shutter 5.

After the latter half of the opening operation of the shutter 5, the pressurization member 7 moves into the recess 12c of the opener 12. It is preferably ensured that the pressurization member 7 does not contact the opener 12 when it is received in the recess 12c.

Figure 4B:
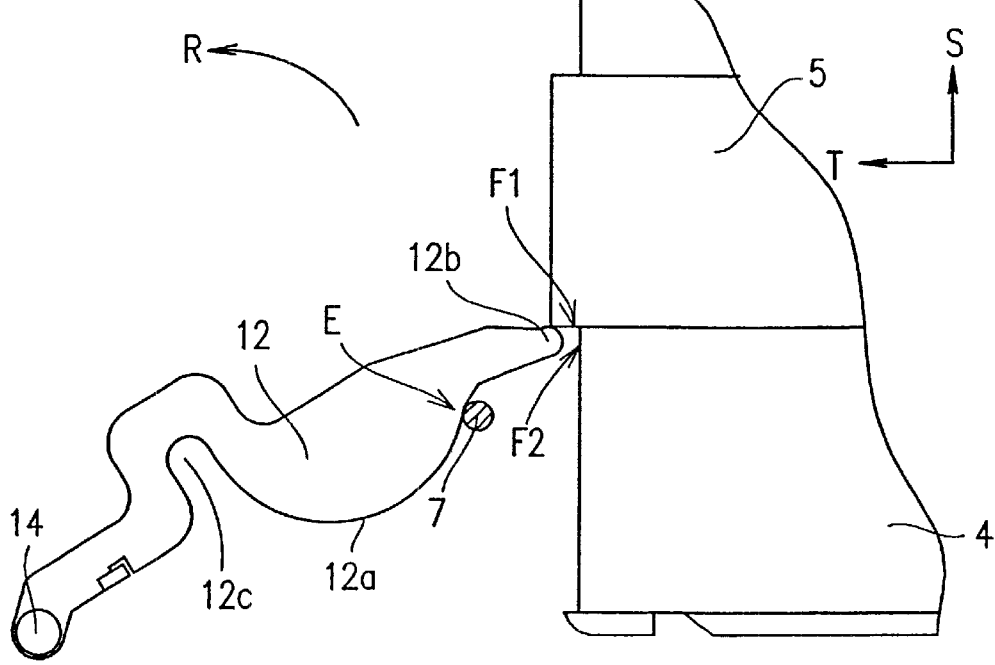
FIG. 4B is a view corresponding to FIG. 4A, illustrating a variant of a shutter according to the present invention.

According to the present embodiment of the invention, as shown in FIG. 4A, the leading end face of the shutter 5 (ahead of the insertion direction T) is staggered at the first end face F1 so that the leading edge 12b of the opener 12 will be caught by the staggered portion of the shutter 5. However, instead of employing a cartridge 4 having such a shutter 5 configuration, the present invention may alternatively employ a shutter 5 as shown in FIG. 4B which has a non-staggered or flush leading end face ahead of the insertion direction T, so that the leading edge 12b of the opener 12 will be caught by an edge of the non-staggered leading end face of the shutter 5, as will be appreciated by those skilled in the art. In the embodiment illustrated in FIG. 4B, the first end face F1 is defined as the aforementioned edge of the non-staggered leading end face of the shutter 5, and the second end face F2 is defined as a leading end face (ahead of the insertion direction T) of the main body of the cartridge 4 that is not covered by the shutter 5. In accordance with the shutter 5 as shown in FIG. 4B, too, the opener 12 is prevented from generating any component force that acts in such a direction as to dispel the cartridge 4 out of the disk apparatus main body 1 during an opening operation of the shutter 5, so that the loading force required during the opening operation of the shutter 5 can be reduced.

Figure 5:
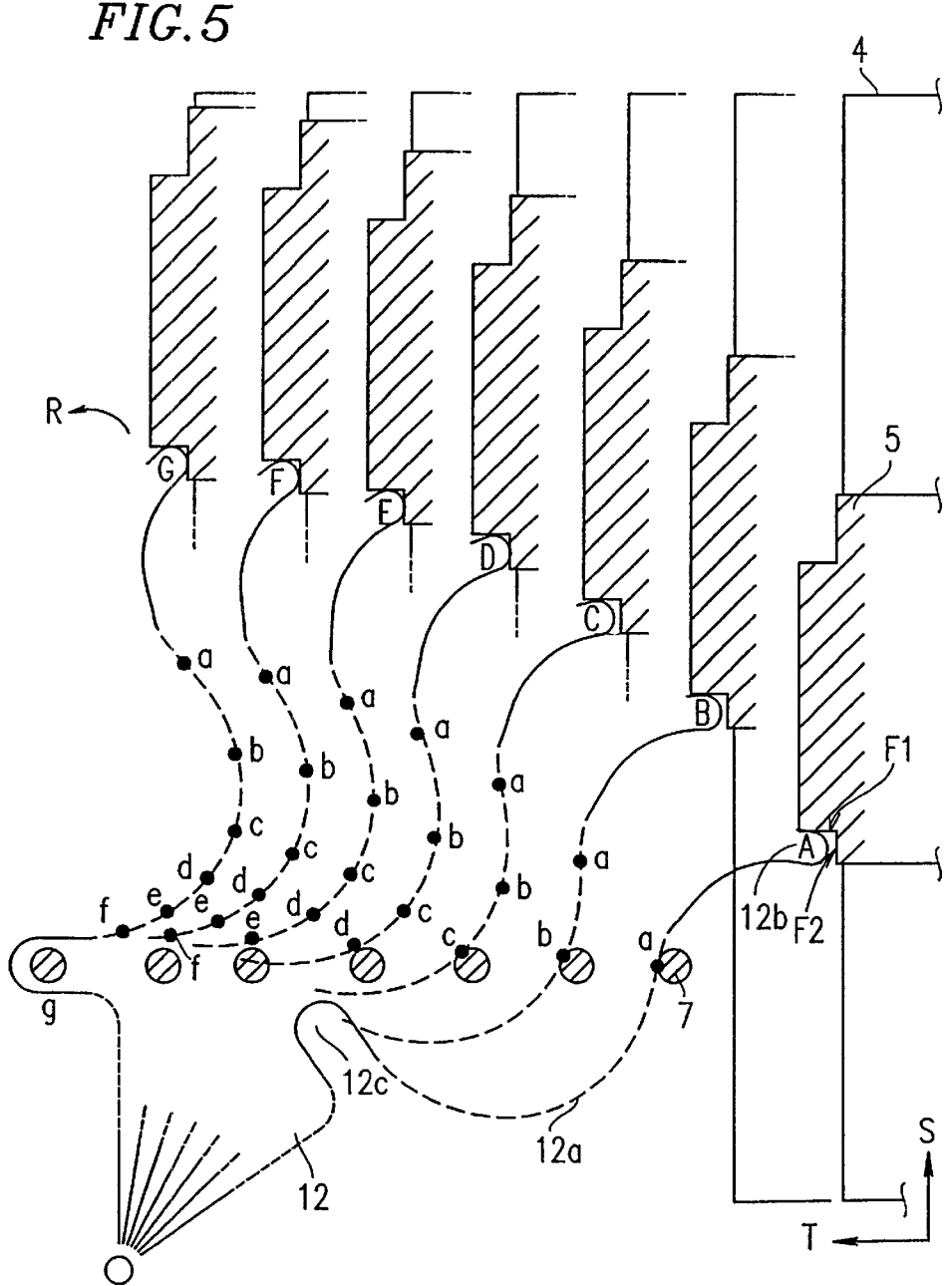
FIG. 5 is a schematic diagram illustrating a method for designing the configuration of an opener of the disk apparatus according to the present invention.

Hereinafter, a method for designing the configuration of the opener 12 according to the present embodiment of the invention will be described. FIG. 5 contains multiple illustrations of a series of positions consecutively taken by the shutter 5, the pressurization member 7, and the opener 12 during an opening operation of the shutter 5. The effects of the present invention depend upon the portion of the edge or perimeter of the opener 12 (including the cam portion 12a) facing away from its rotation direction R, i.e., the portion which comes in contact with the pressurization member 7 during the opening operation of the shutter 5. The following description concerns a method for designing the configuration of this portion of the edge curve. For clarity, only this portion of the edge curve (including the cam portion 12a), facing away from the rotation direction R of the opener 12, is illustrated in FIG. 5.

The cartridge 4 is transported by the tray 2 in the insertion direction T, into the disk apparatus main body 1, and comes in initial contact with the leading edge 12b of the opener 12 at a position A. At position A, the leading edge 12b of the opener 12 is in contact with the first end face F1 of the shutter 5. In order to prevent the shutter 5 from further approaching the opener 12 at this point in time, which would cause the second end face F2 to come in contact with the leading edge 12b of the opener 12, the cam portion 12a of the opener 12 at position A must be in abutment with the pressurization member 7 provided on the tray 2. Accordingly, a point a on the circumference of the pressurization member 7 (as seen in the direction in which FIG. 5 is illustrated) should define a contact point (edge point) between the pressurization member 7 and the opener 12. The point a is located ahead of the insertion direction T.

The cartridge 4 is further carried forward in the insertion direction T, causing the leading edge 12b of the opener 12 to rotate to a position B. Meanwhile, the pressurization member 7 travels substantially the same distance as does the cartridge 4 because the pressurization member 7 is provided on the tray 2 by which the cartridge 4 is transported. In order to prevent the second end face F2 of the shutter 5 from coming in contact with the leading edge 12b of the opener 12 at position B, the cam portion 12a of the opener 12 at position B must be in abutment with the pressurization member 7. Accordingly, a point b on the circumference of the pressurization member 7 should define a contact point (edge point) between the pressurization member 7 and the opener 12. The point b is located substantially ahead of the insertion direction T.

The cartridge 4 is further carried forward in the insertion direction T, causing the leading edge 12b of the opener 12 to rotate to a position C. In order to prevent the second end face F2 of the shutter 5 from coming in contact with the leading edge 12b of the opener 12 at position C, the cam portion 12a of the opener 12 at position C must be in abutment with the pressurization member 7. Accordingly, a point c on the circumference of the pressurization member 7 should define a contact point (edge point) between the pressurization member 7 and the opener 12. The point c is located substantially ahead of the insertion direction T.

The cartridge 4 is further carried forward in the insertion direction T, causing the leading edge 12b of the opener 12 to rotate to a position D. By this time, the shutter 5 has traveled a slide distance in the slide direction S which equals approximately a half of the slide distance that would be required for the shutter 5 to be fully open (indicated by the opener 12 being at a position G). At this point in time, the leading edge 12b of the opener 12 may be in contact with the second end face F2 as mentioned earlier. Therefore, the cam portion 12a of the opener 12 at position D does not need to be in abutment with the pressurization member 7. Accordingly, a point d slightly off the circumference of the pressurization member 7 should define a contact point (edge point) between the pressurization member 7 and the opener 12. The point d need not be located exactly ahead of the insertion direction T but may be slightly upward therefrom.

The cartridge 4 is further carried forward in the insertion direction T, causing the leading edge 12b of the opener 12 to rotate to a position E, and further to a position F. Corresponding edge points e and f of the opener 12 are defined for positions E and F in a manner similar to defining the edge point d for position D. At the final position G, which corresponds to the fully-open state of the shutter 5, an edge curve g of recess which surrounds the pressurization member 7 without necessarily contacting the pressurization member 7 is determined.

The series of edge points a, b, c, d, e, f, . . . and an edge curve g obtained in the above-described manner are connected to give an entire edge curve. The opener 12 according to the present invention can be obtained by designing a cam portion 12a and a recess 12c so as to present substantially the same contour as the obtained edge curve. It will be appreciated that a more ideal edge curve can be obtained as more edge points are set in this designing method.

The portion of the edge curve facing away from the rotation direction R of the opener 12 is also interrelated with the relative positions of the pressurization member 7 and the cartridge 4, specifically, the interspace between the pressurization member 7 and the first end face F1 of the cartridge 4 and the interspace between the pressurization member 7 and the second end face F2 of the cartridge 4. Therefore, it will be readily appreciated that the configuration of the opener 12 obtained by the above-described designing method varies as the relative positions of the pressurization member 7 and the cartridge 4 vary.

The opener 12 and the pressurization member 7 are preferably composed of a material having a very low coefficient of friction, e.g., polyacetal, thereby minimizing the friction force generated between the cam portion 12a and the pressurization member 7. A rotary mechanism, e.g., a roller, may be employed to implement the pressurization member 7 so as to further reduce the friction force generated between the cam portion 12a and the pressurization member 7.

Figure 6:
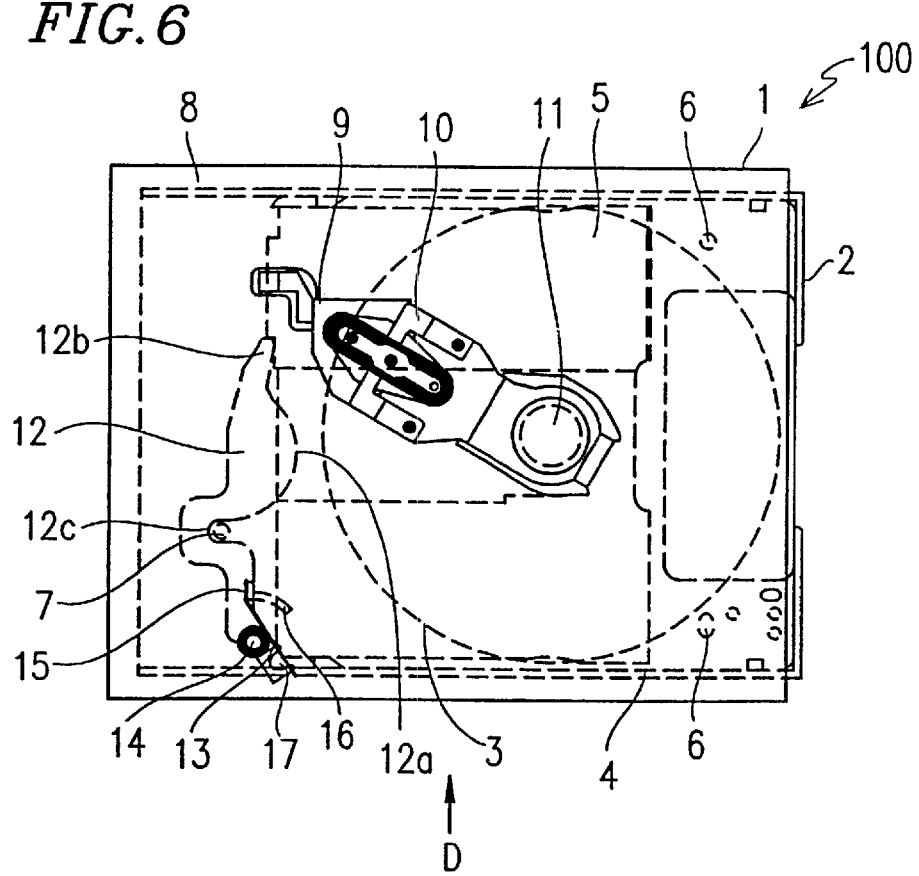
FIG. 6 is an upper plan view illustrating a portion of a disk apparatus according to one embodiment of the present invention in a cartridge loaded state.
Figure 7:
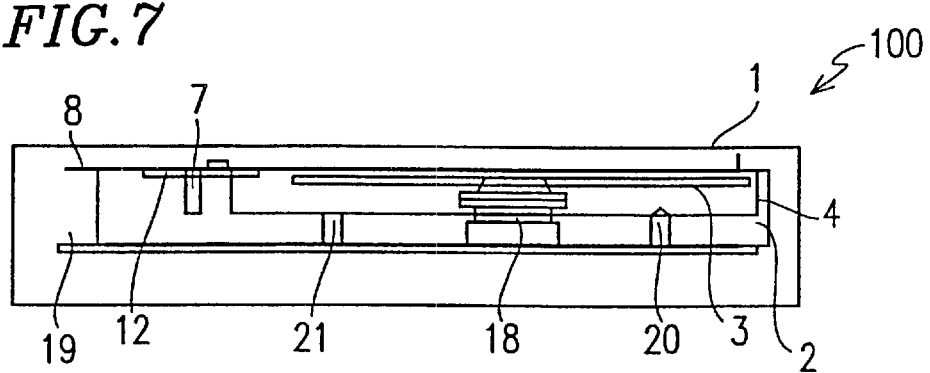
FIG. 7 is a perspective view showing the disk apparatus of FIG. 6 as observed from direction D.
Figure 8:
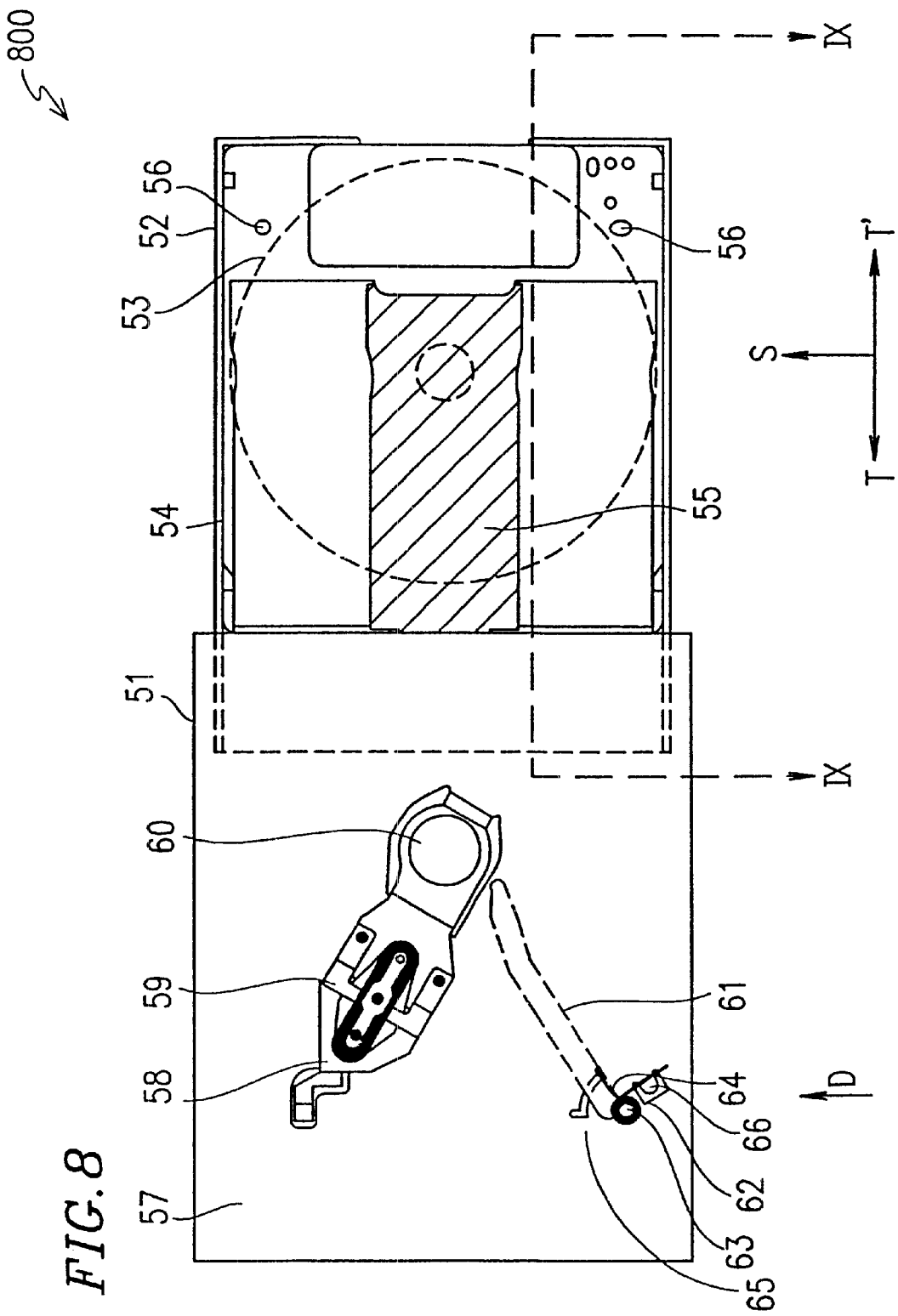
FIG. 8 is an upper plan view illustrating a portion of a conventional disk apparatus.
Figure 9:
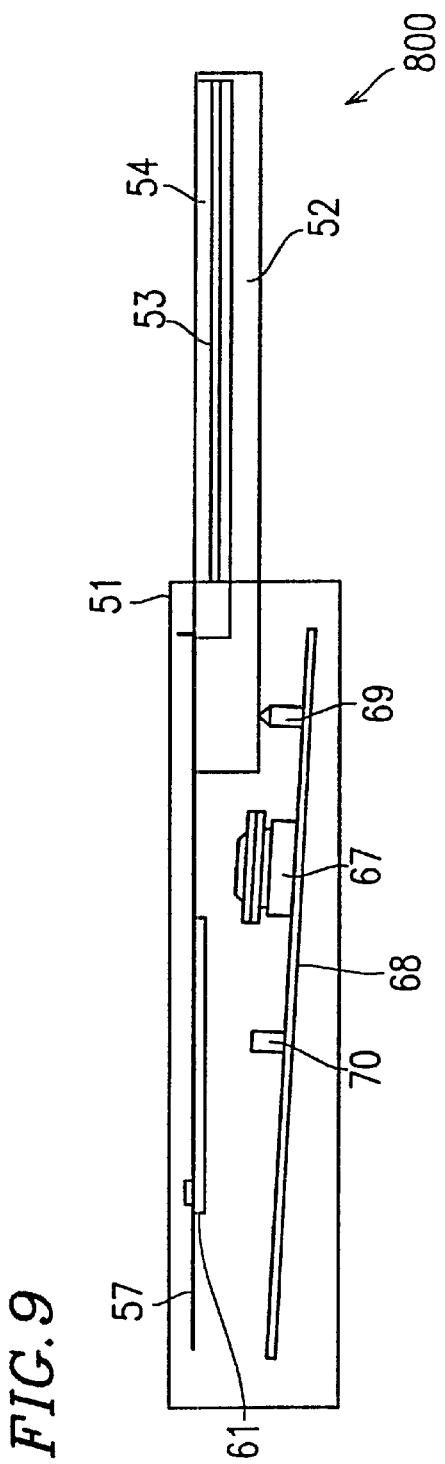
FIG. 9 is a side view of a portion of the conventional disk apparatus shown in FIG. 8, including a partial cross section view thereof.
Figure 10A:
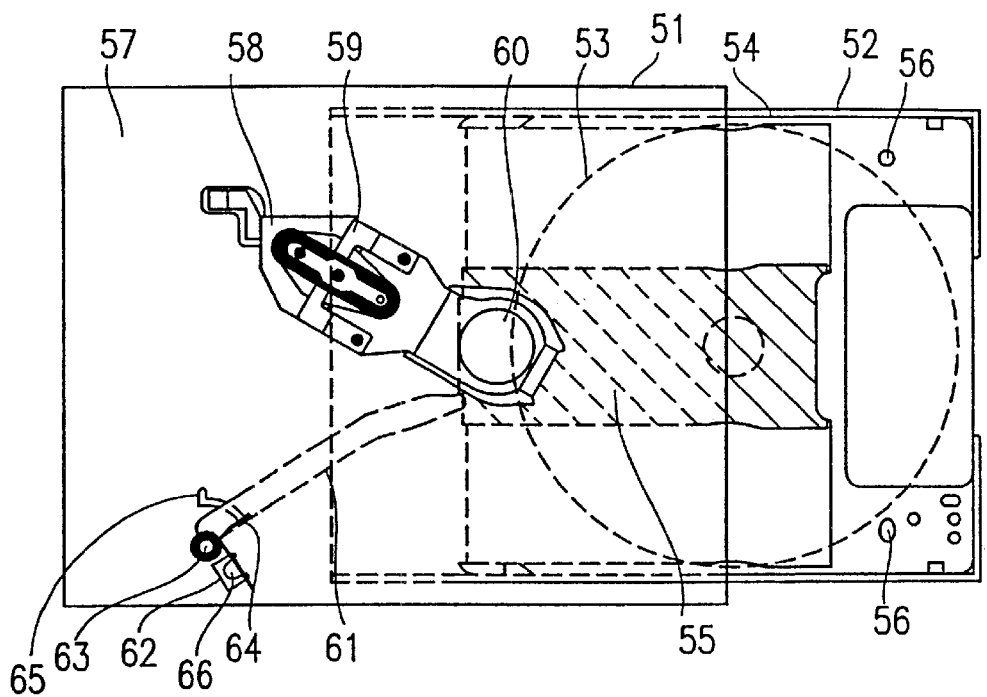
FIG. 10A is an upper plan view of a portion of a conventional disk apparatus, illustrating an intermediate state between a cartridge unloaded state and a cartridge loaded state.
Figure 10B:
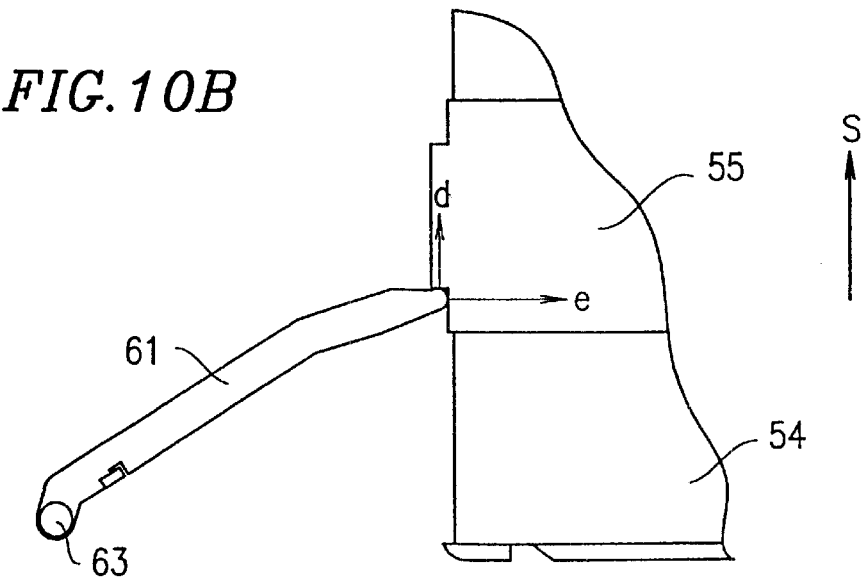
FIG. 10B is an enlarged view of a portion of FIG. 10A.

Hereinafter, the disk apparatus 100 with the cartridge 4 being loaded in the main body 1, i.e., in a fully-open state of the shutter 5, will be described with reference to FIGS. 6 and 7. FIG. 6 is an upper plan view similar to FIG. 1, illustrating a portion of the disk apparatus 100 with the cartridge 4 being loaded in the main body 1. FIG. 7 is a perspective view of the disk apparatus 100 as observed from direction D in FIG. 6.

In the cartridge loaded state as shown in FIGS. 6 and 7, the tray 2 and the cartridge 4 are entirely accommodated within the disk apparatus main body 1. In this state, the shutter 5 is completely open, and the pressurization member 7 received within the recess 12c is not in contact with the opener 12. The cam portion 12a is conveniently received in a space which appears within the open shutter 5 (extending in a thickness direction), so that the cam portion 12a does not contact and interfere with cartridge 4. When the tray 2 and the cartridge 4 are entirely accommodated within the disk apparatus 1, the motor support base 19 (see FIG. 2), which was tilted to clear the way for the tray 2 and the cartridge 4, takes a parallel (i.e., to the insertion direction T), preferably horizontal posture. The cartridge 4 is positioned by means of the positioning pin 20 and the cartridge support pin 21, and the disk 3 is mounted on the disk motor 18, and the pressure fixed by the clamper 11 so as to stay in place.

From the cartridge loaded state shown in FIGS. 6 and 7, an operation for ejecting the cartridge 4 out of the disk apparatus main body 1 may occur as follows. First, after the motor support base 19 tilts to clear the way for the tray 2 and the cartridge 4, the tray 2 and the cartridge 4, begin to slide in an ejection direction (i.e., the opposite direction T' of the insertion direction T) which preferably is a horizontal direction. As the tray 2 slides, the pressurization member 7 which was located in the recess 12c gradually comes in contact with the cam portion 12a, and the leading edge 12b of the opener 12 allows for gradually closing the shutter 5 of the cartridge 4 while counterbalancing the restoring forces of the shutter 5 itself and the opener spring 13. After the shutter 5 is closed, the tray 2 and the cartridge 4 are further transported along the horizontal direction so as to slide to a cartridge ejected position (i.e., the unloaded state as shown in FIG. 1).

As described above, according to the present invention, the shutter 5 is not pressurized against the cartridge 4 by the opener 12 during an opening operation of the shutter 5 of the cartridge 4. A force to open the shutter 5 is generated only in the slide direction S of the shutter 5. As a result, the loading force required during the opening operation of the shutter 5 can be reduced, thereby preventing abrasion between the shutter 5 and the main body of the cartridge 4 during the sliding of the shutter 5.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A disk apparatus to which a cartridge accommodating a disk for recording or reproducing information thereon is loaded, the cartridge having a shutter capable of opening so as to expose the disk, the disk apparatus comprising:

a disk transporting section for transporting the cartridge from an unloaded position to a loaded position; and an opener for opening the shutter in a slide direction which is perpendicular to a transportation direction of the cartridge, wherein a leading end face of the cartridge in the transportation direction of the cartridge has a first end face and a second end face, each of which the opener comes into contact with while opening the shutter, the first end face being parallel with the transportation direction and the second end face being parallel with the slide direction, wherein the shutter is opened responsive to a pressurizing force applied in the slide direction to the first end face from the opener, and wherein the opener applies a pressure to the first end face, but does not substantially apply a pressure to the second end face, during at least substantially a first half of an opening operation of the shutter.

2. A disk apparatus according to claim 1, wherein the opener is in contact with the first end face but is not in contact with the second end face during at least substantially the first half of the opening operation of the shutter.

3. A disk apparatus according to claim 1, wherein the disk transportation section includes a pressurization member provided in a position located ahead of the cartridge along the transportation direction, the pressurization member being arranged so as to engage with the opener during at least substantially the first half of the opening operation of the shutter.

4. A disk apparatus according to claim 3, wherein a distance between the second end face and a point of contact between the pressurization member and the opener is greater than a distance between the point of contact and a point on an edge of the opener that comes closest to the cartridge.

5. A disk apparatus according to claim 3, wherein the opener and the pressurization member are arranged so as to be in contact with each other during substantially the first half of the opening operation of the shutter and not during substantially a latter half of the opening operation of the shutter.

* * * * *

UNITED STATES PATENT AND TRADEMARK OFFICE
CERTIFICATE OF CORRECTION

PATENT NO. : 6,469,865 B1  
DATED : October 22, 2002  
INVENTOR(S) : Masuo Maruyama It is certified that error appears in the above-identified patent and that said Letters Patent is hereby corrected as shown below:

<u>Title page,</u>
Item [74], "Kenner" should be -- Renner --.

Signed and Sealed this

Twenty-fifth Day of February, 2003

JAMES E. ROGAN
*Director of the United States Patent and Trademark Office*